United States Patent [19]

Laurent et al.

[11] 4,068,829

[45] Jan. 17, 1978

[54] HEAD FOR MIXING AND DISCHARGING AT LEAST TWO INGREDIENTS

[75] Inventors: Daniel Laurent, Meylan; Alain Felten, Grenoble both of France

[73] Assignee: Secmer S.A., France

[21] Appl. No.: 652,698

[22] Filed: Jan. 27, 1976

[30] Foreign Application Priority Data

Jan. 28, 1975 France .................................. 75 03193

[51] Int. Cl.² .......................... B01F 15/00; F17D 3/00
[52] U.S. Cl. .................................. 366/177; 137/607; 137/625.5; 137/637.4
[58] Field of Search ............... 259/4, 18, 36, 137/607, 137/625.5, 636.4; 425/217, 817 R, 4 R; 251/78

[56] References Cited

U.S. PATENT DOCUMENTS

| | | | |
|---|---|---|---|
| 2,040,663 | 5/1936 | Mallet | 137/607 |
| 2,297,418 | 9/1942 | Koller | 251/78 |
| 2,840,110 | 6/1958 | Parsons | 137/625.5 |
| 2,981,290 | 4/1961 | Meyer | 137/625.5 |
| 3,537,479 | 11/1970 | Nelson | 137/607 |
| 3,905,582 | 9/1975 | Fiorentini | 259/4 |

FOREIGN PATENT DOCUMENTS

1,368,311  9/1974  United Kingdom ................ 137/607

*Primary Examiner*—Leonard D. Christian
*Assistant Examiner*—Robert Pous
*Attorney, Agent, or Firm*—Dowell & Dowell

[57] ABSTRACT

A head for mixing and discharging at least two ingredients comprising distributor valves to mix the products, each valve having a stem associated with a lever pivoted to be controlled by a rod which cooperates with a cam ramp carried by a sliding member capable of being displaced within the head and the slide member being movable to stop distribution of the mixed product and recycle the ingredients into their separate storage reservoirs, the machine being particularly useful in connection with the making of polyurethane.

13 Claims, 3 Drawing Figures

HEAD FOR MIXING AND DISCHARGING AT LEAST TWO INGREDIENTS

FIELD OF INVENTION

This invention relates to improvements in heads for mixing at least two ingredients under pressure and discharging from the head a resulting product, and more especially, but not exclusively, for the making of various foamed materials.

THE INVENTION

It is well known that for the production of foamed materials it is necessary to intimately mix at least two ingredients, the mixture obtained then being discharged into a mold or similar device for forming it into the desired shape. The mixing heads comprise injector means for each ingredient which includes a storage reservoir, a pump, and a distributor valve. The pump functions in a continuous manner, and the above parts are connected in such a way that when the valve injector is closed, that is to say when the discharge to the mixing chamber is stopped, the ingredient under consideration is recycled so that it is returned to the reservoir.

The cleaning of such heads is difficult to effect. Moreover, the distributor valves for the different ingredients must be perfectly synchronized in order that the relative proportions of the ingredients will be correct.

The improvements which are the object of the present invention are intended to provide a mixing head which operates in such a way that it will itself control the distributor valves so that no device need be inserted into the ingredient supply system for the purpose of interrelating the pumps with the respective heads. This must be achieved using inoxidizable materials, which are of considerable advantage when operating a system mixing corrosive ingredients.

The head according to the invention comprises as many distributor valves as there are ingreidnets to be mixed. The valves are coupled with means which permit their opening and closing in a synchronized manner as a function of the position of a sliding member intended to control the flow to the mixing chamber.

When dealing with ingredients flowing in mass, but at different rates, it is necessary that the opening of two valves occur at the same time and that their closing be also accomplished at the same time, although they will have travelled unequal distances. Stated otherwise, the speed of opening of the several valves must according to a preferred operation, be different as compared with each other. To achieve this purpose, it is necessary

THE DRAWINGS

The drawings provide clear illustrations of embodiments of the invention, its characteristics and the advantages which they are able to achieve.

Figure 1:
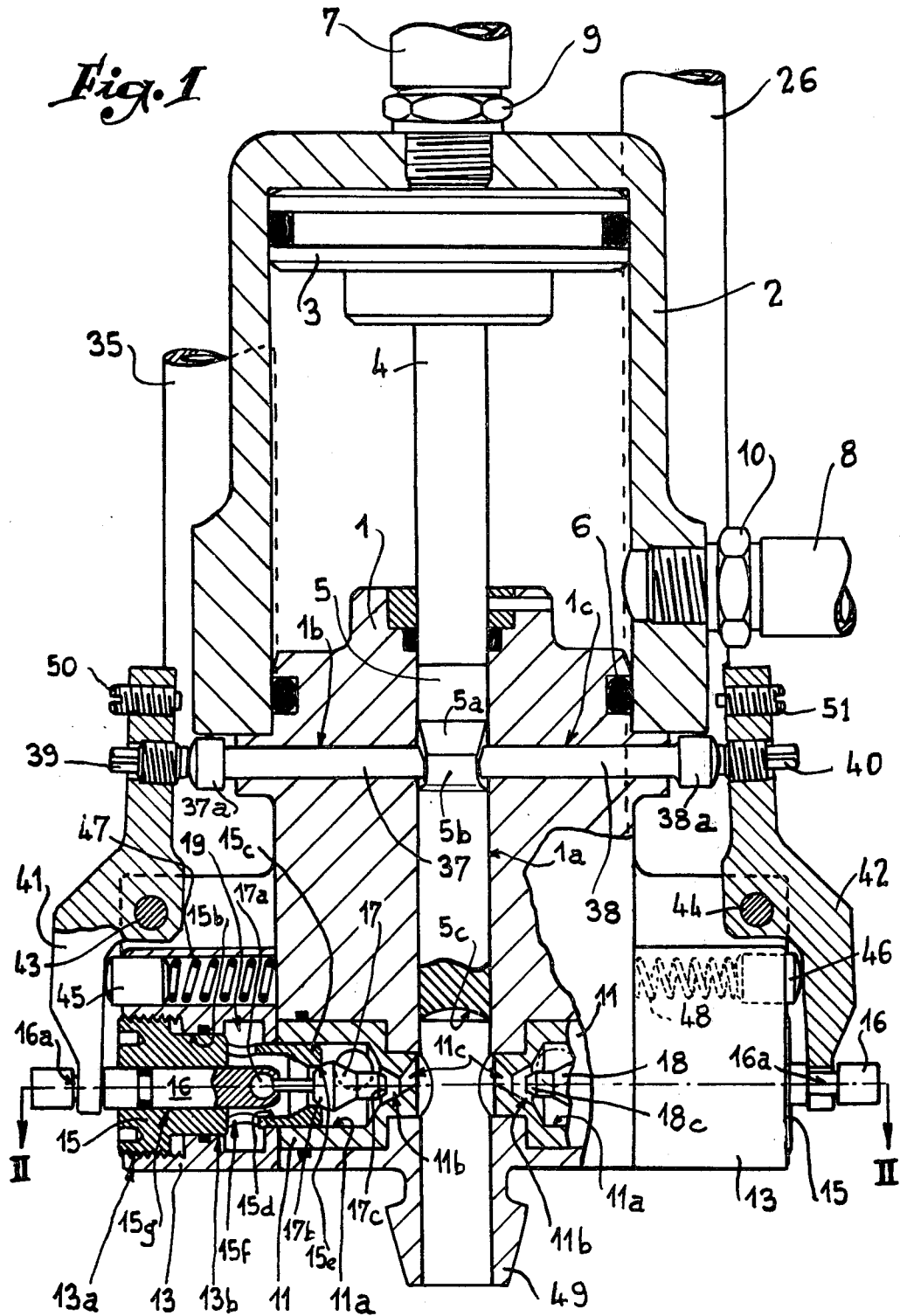
FIG. 1 is a longitudinal section taken through a mixing head for mixing ingredients under pressure and discharging a mixed product, particularly intended for the making of a foamed product.

FIG. 1 shows a mixing and discharge head according to the invention comprising a body 1 supporting a cylinder 2 in which there is a displaceable piston 3 whose rod 4 extends to join a sliding member 5 which passes through the body 1 in a central bore 1a thereof. The cylinder 2 is fixed by suitable means to the body 1, a fluid type seal 6 being located between the two pieces. The cylinder 2 and the piston 3 form an hydraulic jack of the double acting type, that is, movable in opposite directions depending on whether fluid is introduced under pressure into one or the other of the ducts 7 and 8 extending from the respective couplings 9 and 10 for a purpose which will be explained hereinafter.

Two sleeves 11 extend diametrically oppositely into the interior of the body 1 and outwardly toward the exterior of the body adjacent to flanges 13, the sleeves being suitably fixed to the body by means which are not illustrated.

Each sleeve 11 is provided with an axial bore 11a which is extended in the direction of the center of the body by a conical seat 11b opening into a discharge orifice 11c which exits through the end of the sleeve 11, and is oriented obliquely upwardly as shown in the drawing, FIG. 1. The end of each sleeve faces toward the center of the body near the top of exposed wall surfaces of the internal bore 1a, which constitutes the mixing chamber for the ingredients.

A plug member 15 is screwed into a threaded bore 13a in each of the several flanges 13. Each plug includes a part 15b which is in fluid tight contact with a wall 13b formed in the flange 13, and each plug also carries a cylindrical ferrule 15c which is engaged in the bore 11a of each sleeve 11.

There is provided in each ferrule 15c a bore 15d which terminates at the free end of that ferrule in a seat 15e. It should be noted that the bore 15d communicates with the exterior by a number of radial holes 15f. In the central bore 15g of each plug 15 there is engaged a control stem 16 whose interior end is crimped about a ball 17a of a needle valve stem 17, or 18 to the right-hand side of FIG. 1, respectively. Each of the two valve stems carries an enlargement 17b, or 18b, capable of being closed in a fluid tight manner against the seat 15e of the corresponding plug 15. The free end of each valve opposite its ball is provided with a needle 17c or 18c which is intended, when pushed, to close the discharge orifice seat 11b in the sleeve in a fluid tight manner. It will be noted that the enlargement of each valve stem is located so that it faces in the opposite direction from the needle, whereby when one of them is applied against its seat, the other is open.

Figure 2:
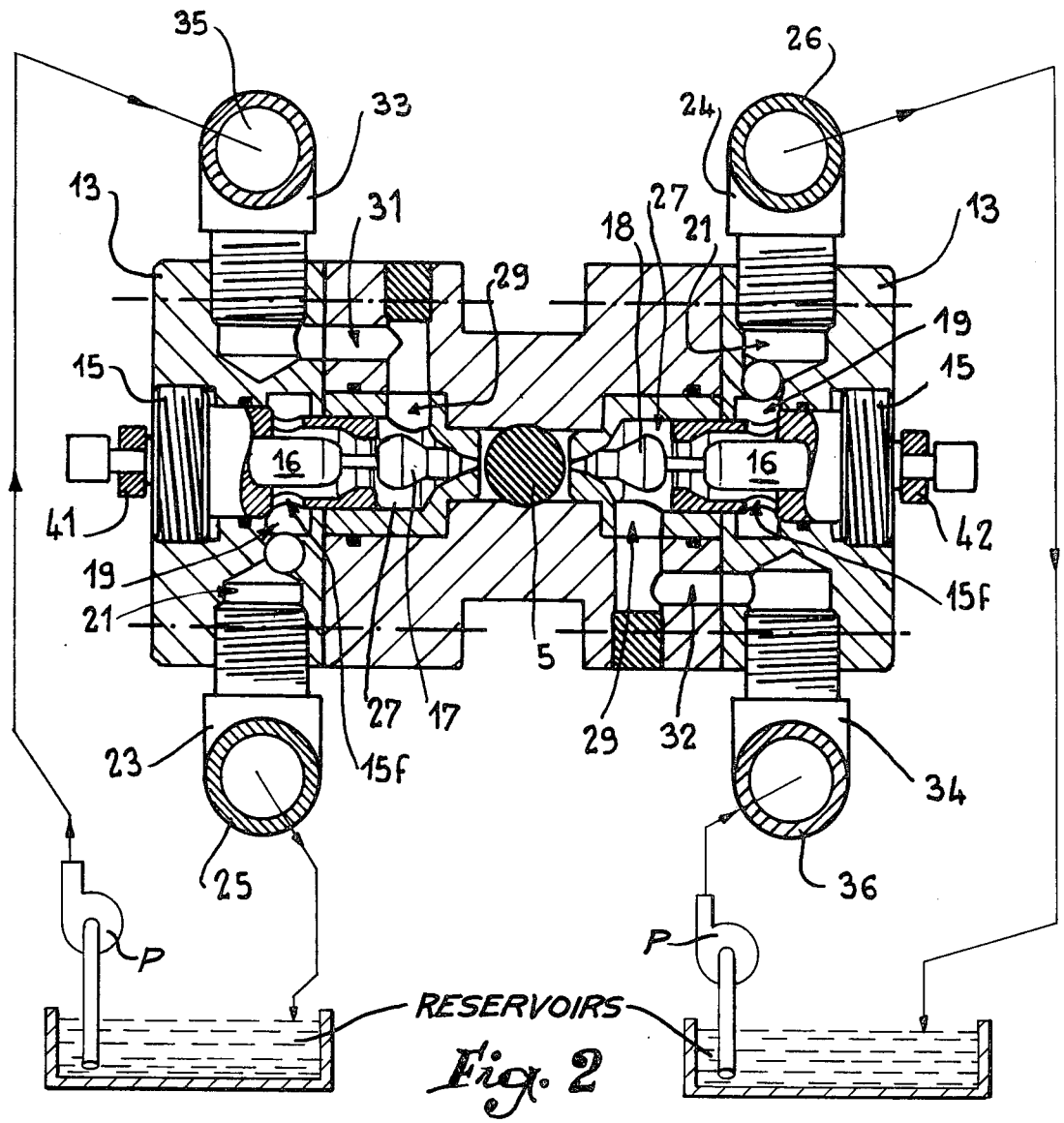
FIG. 2 is a cross-sectional view taken along line II—II of FIG. 1, but showing the distributor valves in closed position.

The ring of holes 15f of each plug 15 opens into an annular chamber 19, FIG. 2, provided in each flange 13. These annular chambers communicate with threaded openings 21 in each of which is screwed a junction fitting 23 which is associated with a return duct 25 or 26, respectively. The space 27 located between the seat 15e of each plug 15 and the seat 11b of the corresponding sleeve 11 communicates by way of an opening 29 with a channel 31, or 32, provided in the body 1. A fitting 33, or 34, screwed into each flange 13 serves to introduce the ingredients arriving in the intake ducts 35 and 36. Each of the channels permits the introduction of one ingredient under pressure into the head according to the invention for mixing of this ingredient with at least one other, and the discharge of the resulting mixture.

There is cut into the slide member 5 an annular truncated conical ramp 5a joined to a cylindrical part 5b whose diameter is smaller than that of the slide member. Two bores 1b and 1c extend into the body 1 and are located opposite the cylindrical part 5b of the slide member 5 when the latter is in its uppermost position. The bores 1b and 1c are diametrically opposed and open into the bore 1a at one end and open outside of the body at the other end. Two rods 37 and 38 are engaged in the aforesaid bores, and have headed ends 37a and 38a located outside of the body, against which the regulating screws 39 or 40 abut. The screws 39 and 40 are screwed into pivoted levers 41 and 42 mounted for free rotation about horizontal axes 43 and 44 which pass through a fixed part of the flanges 13. The free end of each lever is shaped in the form of a fork and surrounds a reduced portion 16a in each stem 16 near the extreme end which extends from the corresponding plug 15, FIG. 1.

Each flange 13 carries a dog 45 or 46 one of whose ends abuts against the lower leg of each of the levers 41 or 42 urged by a compression spring 47 or 48. Thus, the upper leg of each lever is pressed against a corresponding rod 37 or 38, which in turn closes the enlargements 17b or 18b of the valves against the corresponding seat 15e of each plug when the piston 3 is in its uppermost position, FIG. 1, i.e., when the rods 37 and 38 rest against the cylindrical part 5b of the slide member. In this position, the ingredients which arrive in the mixing chamber 1a via the intake channels 35 and 36 are mixed by projection against the concave lower extremity 5c of the slide member 5, and will be discharged to travel through an integrally formed duct 49 at the lower end of the body 1.

When the mixing and discharge is to be stopped, the piston 3 is advanced downwardly by the introduction of fluid under pressure via the duct 7. The piston moves downwardly with the ramp 5a pressing both rods 37 and 38 outwardly, which causes the levers 41 and 42 to pivot so that the stems 16 are pushed simultaneously inwardly, thereby closing the needles 17c and 18c of the valves 17 and 18 against the seats 11b of each sleeve 11. Conversely, the enlargements 17b and 18b are lifted from their seats 15e whereby each chamber 19 and 20 is opened into communication with the space 27 and 28, respectively, whereby the return ducts 25 and 26 are opened as shown in FIG. 2, and the ingredients which arrive under pressure in the head are recycled in the direction of their respective points of departure.

Each supply reservoir has a variable output pump P whose inlet communicates with the bottom of the reservoir and whose variable output is coupled to one of the intake channels 35 and 36. As a result of the fact that the return ducts have a different cross-section than the intake ducts, the back pressure of each pump would vary with its discharge. To achieve this, one can advantageously provide in each of the return ducts a restriction of appropriate diameter. In the head, it is possible to vary the axial position of each threaded plug 15 in a manner to increase or decrease the opening between its seat and the needle 17c or 18c when the needle is in an open position. Thus, one can vary the moulding pressure, the return pressure varying automatically and in a proportional manner since the lift of the valve, which determines the recycling cross-section between the enlargement 17b or 18b and the seat 15e of the flange also decreases. The output for moulding thus has the same value as that of the return duct output for each axial position of the plug 15. Thus, one achieves independence of output and of pressure in the return duct.

Before operation, the maximum output of each pump, and consequently its highest pressure, occurs just before opening of the valves by the piston, whereby before the opening of each valve for the purpose of discharge, the pressure in the space 27 will have been already established to determine the value which it will maintain during operation. Moreover, a pressure reduction for only a brief instant must occur after closing of the discharge. Each pump functions preferably to provide two predetermined outputs, one low and one high, which correspond respectively to the recycling and to the discharge of the ingredients for mixing. Each of the levers 41 or 42 carries a screw 50 or 51 which can interrupt the control action of the rods 37 and 38 when it is screwed into abutting position against the cylinder 2, for the purpose of moving the corresponding end of the lever outwardly and achieving closing of the corresponding valve. Thus, when one of the screws 50 or 51 is operative, a single ingredient is discharged from the other head. The operator then collects a certain quantity of ingredient during a certain time. He then frees whichever screw 50 or 51 has just been operated, and screws the other one until he achieves a similar cut-off on the other valve. He then collects during the same period of time a measured quantity of the second ingredient, whereby he can verify the proportions of the mixture, varying the latter by adjusting the screws 39 and 40.

Figure 3:
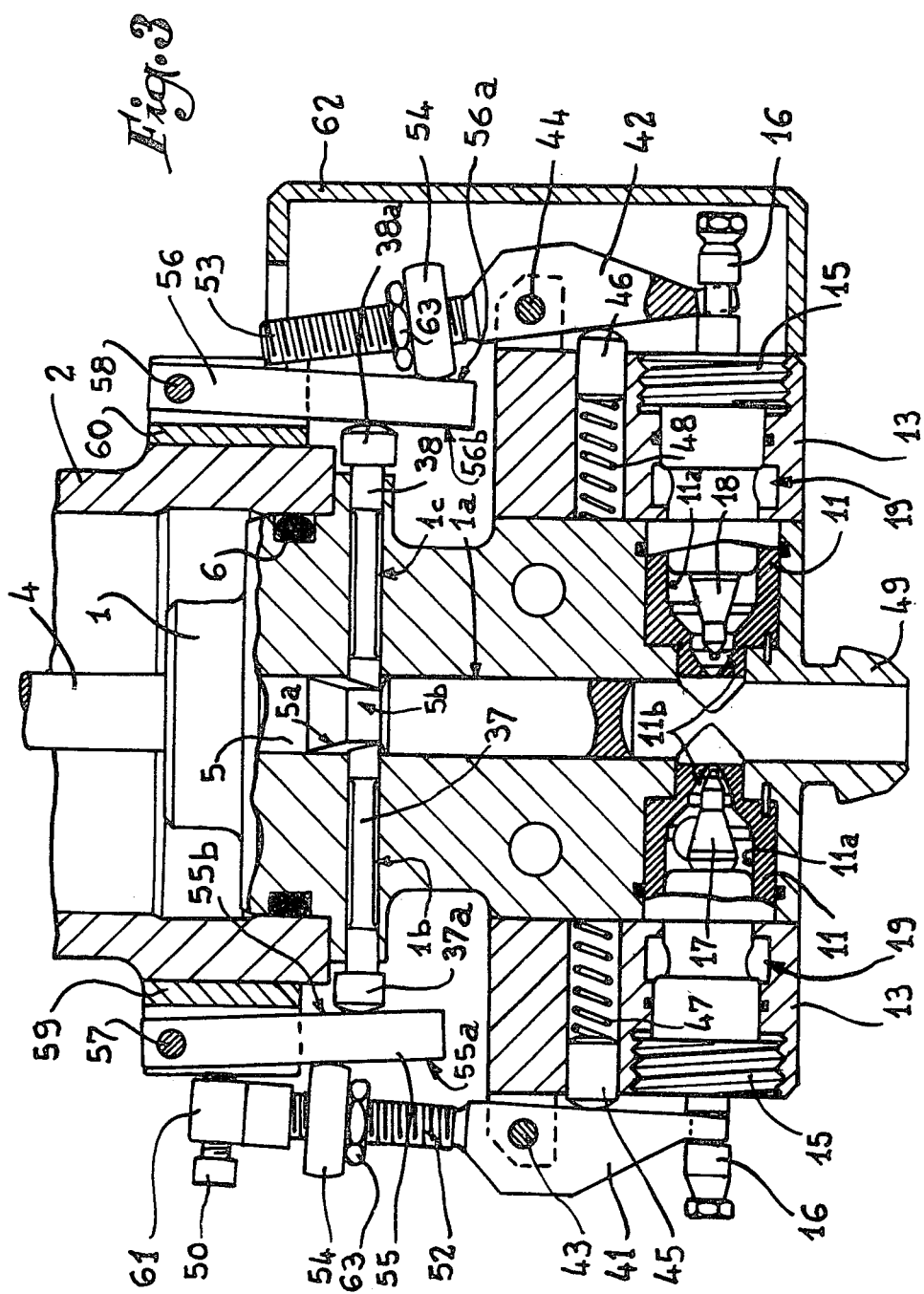
FIG. 3 is a longitudinal section through a mixing head showing a modified embodiment.

According to the modification of FIG. 3, each lever is extended upwardly by a threaded stem 52 or 53 on which is screwed a nut 54 whose periphery is cylindrical and enlarged. This nut cooperates with a downwardly extending intermediate arm 55 or 56 whose upper end is pivoted about a horizontal axis 57 or 58, mounted in a clevis 59, 60 solidly fixed to the cylinder 2. This pendulous arm preferably takes the form of a bar whose cross-section has at least two parallel opposite faces. One of the faces 55a or 56a of each arm is supported against the corresponding nut 54 so that its opposite face 55b or 56b is held against the exterior end of the corresponding rod 37 or 38 because of the action of the spring urged dogs 45 and 46.

The free ends of the threaded stems 52 and 53 of the levers 41 and 42 carries a cap 61 in which is mounted regulating screw 50 serving as a simple means to stop the action of the rods 37 and 38. It should be noted that the cap has not been shown on the stem 53. Similarly, a protective housing 62 is placed around each lever, but only one has been shown protecting the lever 42.

It should be apparent that by varying the position of each nut 54, by screwing or unscrewing it more or less, the selected position being locked by the lock nut 63, one can vary the size of the opening of the valves 17 and 18. Moreover, the beginning and the end of each of these displacements coincides exactly for both of the valves.

FIG. 3 shows the head according to the invention with the valves open. Because of a different position of the nut 54 on each lever 41 or 42, one can see that the valve 17 is much closer approached to its seat than the valve 18 whereby the discharges of the two ingredients will be different.

At the conclusion of the mixing and discharge, the valve stem 5 is displaced downwardly by the piston, the rods 37 and 38 being pushed toward the exterior of the head by the action of the ramp 5a. At this moment, the two pendulous arms 55 and 56 are actuated toward the exterior whereby they force the pivoted levers 41 and 42 in a direction to close the valves. Moreover, the beginning and end of their displacements coincide exactly but the rapidity of their displacements are unequal because they travel different distances during the same interval of time.

Obviously, it goes without saying that control by the pendulous arms 55 and 56 could be achieved by any other mechanism functioning in a synchronous manner in response to the position of the slide member 5.

It goes without saying that the head described above is not to be limited to mixing and discharging only two ingredients, but that it can be used to mix and discharge any number thereof by providing the required number of distributing valve mechanisms.

I claim:

1. A head for mixing at least two ingredients supplied thereto from plural sources under pressure and for discharging the mixed product, comprising:
   a body having a main bore therethrough, having a mixing chamber, and having a separate transverse bore extending into said main bore corresponding with each ingredient;
   a slide member in the main bore and having ramp surfaces in the vicinity of said transverse bores, and means for moving the slide member axially in the main bore;
   distribution valve means corresponding with each ingredient coupled to a source and extending through the body, and each valve means having two valves controlling the flow of the ingredient in different branches of the valve including a discharge branch communicating with a discharge seat at a discharge orifice extending into said mixing chamber, and including a recirculation branch having a return flow seat and leading to a duct returning to the associated source, and each valve means having a stem reciprocable through said discharge and return flow seats and having needle valves facing the respective seats and operative to control the flow through the seats inversely, whereby the flow through one seat is restricted as the flow through the other seat is increased; and
   control means for each ingredient, each control means including rod means in each transverse bore contacting and being positioned by a ramp surface and having an outer end extending from the transverse bore by a distance determined by the axial position of the slide member, and including a lever for each rod means pivotally attached to the body of the head and having one leg tilted about the pivot in response to motion by the rod means and having another leg coupled to reciprocate a corresponding valve to displace the axis of pivoting of the actuating levers for one valve with respect to the other, which can be done simply by changing the point of application of push rods which are associated with a sliding member against which the rods rest.

According to one modification, the pivoted lever which serves to actuate each valve is provided with an axially regulated abutment which cooperates with a pendulous arm moved by contact with the corresponding control rod. means.

2. A mixing head as set forth in claim 1, wherein each valve stem is reciprocable to an open position to couple the flow of ingredient to said discharge orifice, and to a closed position wherein said discharge is blocked, movement of the slide member in the bore modulating the positions of all valve means simultaneously.

3. A mixing valve as set forth in claim 2, wherein said valve stems are straight and extend through the valve seats and are coupled respectively to a corresponding pivoted lever, and said needle valves on each stem are oriented thereon back-to-back in spaced relationship.

4. A mixing valve as set forth in claim 3, wherein said discharge seat and said return flow seats are supported on different portions of the valve means, which portions are mutually adjustable axially of the valve stem with respect to each other whereby adjustment of the spacings between the valve seats varies the proportion of the ingredient which is discharged from the orifice as compared with the ingredient which is recirculated through the return duct.

5. A mixing valve as set forth in claim 4, wherein each return duct has a restriction therein tending to encourage flow of the ingredient through said discharge orifice.

6. A mixing valve as set forth in claim 1, wherein the flow through each valve means is adjustable and each control means includes screw means carried by a leg of the associated lever and adjustable to bear against the body and pivot the lever to maintain the valve means closed to block flow of the ingredient into said discharge orifice.

7. Apparatus as set forth in claim 1, wherein said source includes a pump having a variable output for feeding each ingredient to a valve means from a corresponding reservoir, means for adjusting the output pressure from each pump when the corresponding discharge valve means is closed, the pressure for each valve means being affected for only a brief instant when the valve means is reclosed.

8. A mixing valve as set forth in claim 2, wherein said control means includes means operative between the rod means and the associated lever for changing the rate of displacement of the associated valve stem upon movement of the slide member and for reaching closed position for all of the valve means at the same time.

9. A mixing head as set forth in claim 8, wherein each pivoted lever controlling a valve means includes an adjustable abutment cooperatively associated with an intermediate arm, the arm being moved by contact with an associated rod means.

10. A mixing head as set forth in claim 9, wherein each intermediate arm comprises a vertically disposed bar pivotally supported at its upper end by a horizontal pin supported by the body of the head.

11. A mixing head as set forth in claim 10, wherein each adjustable abutment comprises a nut supported on a threaded member comprising an upward extension of the lever, said nut being locked in adjusted position by a lock nut.

12. A mixing head as set forth in claim 11, wherein a threaded cap is screwed onto said threaded stem at its end, and adjustable means supported by the cap and selectively operable to lock the lever in a position to close discharge from the valve means.

13. A head for mixing at least two ingredients supplied thereto from plural sources under pressure and for discharging the mixed product, comprising:
    a body having a mixing chamber;
    separate valve means in the body corresponding with each ingredient and each having a discharge orifice leading into said mixing chamber;
    movable ramp means carried by said body;
    a follower arm corresponding with each valve means and mounted to the body at a first pivot, the arms being coupled to the ramp means to be equally displaced by said ramp means when moved; and
a lever corresponding with each valve means and mounted to the body at a second pivot spaced from the first pivot, each lever having one leg extending adjacent to a corresponding one of said arms and having another leg coupled with a corresponding valve means to transmit displacement of said another leg to the valve means, and an abutment interposed between each arm and the adjacent leg and selectively adjustable lengthwise thereof to vary the rate of displacement of the lever and valve means as compared with the displacement of the corresponding arm, whereby the discharge rates of the ingredients can be made different.

* * * * *